May 21, 1929.  F. SCHNEIDER ET AL  1,714,483
HEADLIGHT FOR SMALL SIZED MOTOR CARS AND MOTOR CYCLES
Filed July 22, 1925
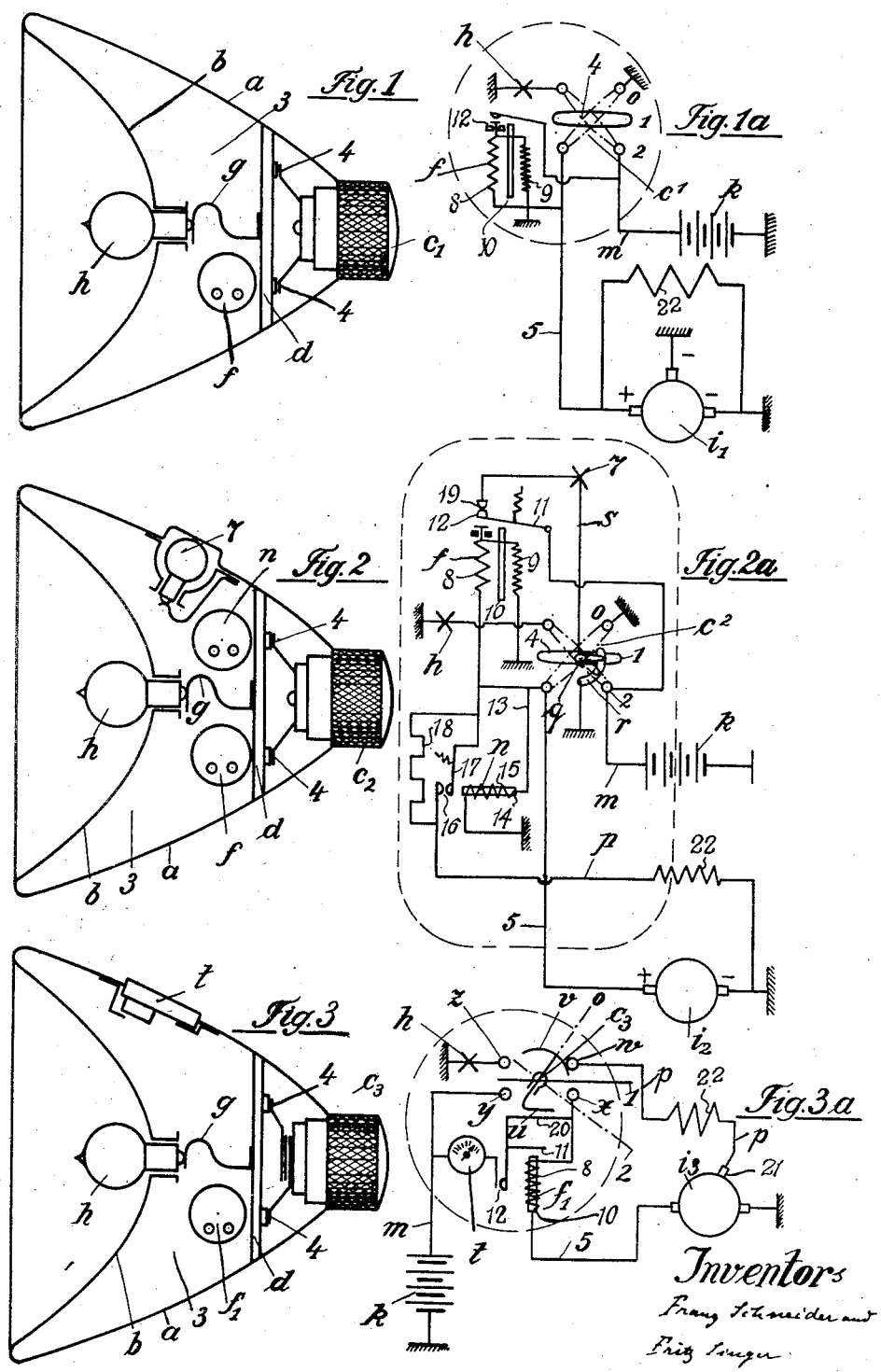
Inventors
Franz Schneider and
Fritz Singer

Patented May 21, 1929.

1,714,483

UNITED STATES PATENT OFFICE.

FRANZ SCHNEIDER, OF BEHRINGERSDORF, AND FRITZ SINGER, OF NUREMBERG, GERMANY, ASSIGNORS TO "FENAG" AKTIENGESELLSCHAFT, OF NUREMBERG, BAVARIA, GERMANY.

HEADLIGHT FOR SMALL-SIZED MOTOR CARS AND MOTOR CYCLES.

Application filed July 22, 1925, Serial No. 45,378, and in Germany April 8, 1924.

The smaller a vehicle is the more difficult it is to accommodate in the same plant for electric lighting and especially the auxiliary apparatus. This is the reason why on motorcycles the light-switch and a dimming switch have been combined with the headlight in order to avoid the use of a separate switch which wants space and requires special fixing means.

This invention consists essentially in that an automatic cut-out switch and eventually also a pressure regulator, is or are combined with the head-light.

Up to the present the automatic cut-out switch and the pressure regulator have been mounted on the dynamo machine or accommodated in separate switch or regulator casings. The arrangement of the automatic cut-out switch and of the pressure regulator on the dynamo machine presents the inconvenience that the dimensions of the machine are increased either in longitudinal direction or in transverse direction. This is very inconvenient as, owing to the little space available on a motor cycle, the machine must be of the smallest possible size. If these two elements are mounted in boxes it is difficult to find accommodation for the boxes, and the fixation requires special fixing means. If these elements are accommodated in the head light casing these inconveniences are overcome.

In lighting plants of simpler type which comprise no pressure regulator the switch for the switching in and off of the current production can be arranged on or in the casing of the head light. When the light switch is arranged in the head light the switching element of the light switch can be used at the same time for switching the generation of current in and off. The current and pressure meter or the charge-lamp may be arranged on the top side of the casing.

Several embodiments of the invention are shown, by way of example, in the accompanying drawings in which Figs. 1, 2 and 3 show each in longitudinal section one head-light constructed according to the invention.

Figs. 1ª, 2ª, and 3ª illustrate the corresponding connections.

The connection diagrams illustrate the extraordinary simplification of the arrangement of the electric conductors and the advantage of the arrangement according to the invention which is obvious for anyone skilled in the art. The elements accommodated in the head light are framed by dash-lines.

Fig. 1 shows the automatic cut-out switch $f$ mounted in the head-light casing. $a$ is the casing of the head-light and $b$ the reflector. The elements of the installation for the electric lighting are accommodated in the chamber 3 behind the reflector $b$. In the apex of the casing $a$ the rotary switch $c'$ is mounted. A switch board $d$ is further mounted in the casing $a$. The switch contacts 4 are fixed on the rear side and the lamp contact $g$ is fixed on the front side of this switch board $d$.

A diagram of connections, adapted for the arrangement shown in Fig. 1, is illustrated in Fig. 1ª in which $i^1$ designates a dynamo of commonly used type comprising current regulation, $k$ a battery, 5 and $m$ the electric conductors from the switch to the machine and to the battery. If the switch is in the zero position the machine is short-circuited and the current generation interrupted. In position 1 there is no short circuit, and the machine produces current which flows from the plus pole through the wire 5 and coil 9 to the mass and thence back to the minimum pole of the machine. The core 10 is therefore magnetized and attracts the armature 11 which closes the contacts 12 so that the current flows now from the plus pole through wire 5, coil 8, contacts 12, armature 11 to the battery. In the position 2 the lamp $h$ of the head-light is switched in.

Fig. 2 shows the accommodation of an automatic cut-out switch $f$, a pressure regulator $n$ and a charge lamp 7 in the head-light casing. The pressure regulator $n$ is mounted on the switch board $d$ same as the automatic cut-out switch $f$ and the charge lamp 7 is arranged in an aperture in the top wall of the casing so that the cyclist can observe this lamp.

Fig. 2ª shows the connection diagram for this arrangement. A shunt generator of known type is provided which co-operates with the regulating elements. $i^2$ is the shunt generator, $k$ a battery, 5, a wire leading from switch $c^2$ to the plus pole of the machine, $m$ a wire from switch $c^2$ to the battery $k$, and $p$ a wire from the contacts 16 of the pressure regulator $n$ across the field winding 22 to the minus pole of the machine.

The one pole of the charge-lamp 7 is in the cut-out position connected with the battery $k$ by the pair of contacts 19, armature 11, contact 2 of switch $c^2$ and the wire $m$, the other pole being connected to the contact tongue $q$ by the wire $s$ said contact tongue being mounted insulated upon the slide contacts 4 and adapted to slide into the switching in position 1 and 2 upon a contact piece $r$ electrically connected with the mass, whilst in the contact position 0 there is no contact between $r$ and $q$. The charge lamp is therefore not lighted in the position 0. As the wire 5 is earthed by the contacts 4 the machine is short circuited, so that there is no current production. In the switch position 1 the charge lamp is lighted at first as its circuit is closed by the switch tongue $q$ and the contact piece $r$. The machine can now produce current as the short-circuiting of the machine is suppressed. The current which flows through the wire 5, the coils 8 and 9 magnetizes the core 10, attracts the armature 11 and closes the contacts 12 so that current flows now through the wire 5, coil 8, pair of contacts 12, armature 11, the switch contact 2 and the wire $m$ to the battery. At the same time cut-out is established in the pair of contacts 19 whereby the circuit of the charge lamp 7 is interrupted and this lamp is extinguished. The pressure regulator $n$ is connected between the wires $p$ and 5. With the aid of wire 13 a voltage coil 15 is laid on the wire 5, the other end of coil 15 being earthed. On wire 5 a movable armature 17 and a pair of contacts 16 is also laid. One contact of the pair of contacts 16 is connected to the wire $p$. A resistance 18 is laid at one end on wire 5 and at the other end on wire $p$ and is consequently parallel to the pair of contacts 16. The current which flows in the coil 15 magnetizes the core 14 which attracts the armature 17 as soon as a predetermined voltage is exceeded so that now the exciter current can no longer flow directly to $p$ and to the field winding 22 but only through the resistance 18. Owing to the reduced excitation the machine voltage sinks, the contacts 16 come in contact the one with the other and the excitation has again its full value. This proceeding repeats itself in rapid succession as long as the machine voltage exceeds the predetermined value. In position 2 the lamp $h$ of the head light is also laid on the battery by wire and contacts 4 and switched in.

Fig. 3 illustrates an arrangement similar to that shown in Fig. 1. An ampere-meter $t$ is arranged in the top part of the casing and designed to indicate the current. Fig. 3ª shows a connection diagram for an arrangement in which the machine is made currentless by cutting out of the exciter-winding. A machine is used having an excitation taken from a third brush. In the position 0 of the switch the contact segment $v$ touches only the switch contact $w$ so that the machine receives no excitation and no current generating can take place. In position 1 of the switch the contact segment $v$ touches the contacts $w$ and $x$, the exciter winding 22 is thereby connected to the plus brush of the light machine by coil 8 of the automatic switch $f$ and by wire 5. The other end of the exciter winding lays on the third brush 21 of the dynamo. The exciter circuit is therefore closed. The current flowing in this circuit magnetizes the core 10 which attracts the movable armature 11 and closes the pair of contacts 12. The current from the machine can now flow over wire 20 to the pair of contacts 12 over the current indicator $t$ and the wire $m$ to the battery $k$. In position 2 the lamp $h$ of the head light is laid on the battery and switched in by means of the elbow lever $n$ over the contacts $x$ and $y$.

We claim:—

1. A head light for the electric lighting plant of small size motor vehicles, comprising a head lamp casing, and an automatic cut-out secured on said head lamp casing.

2. A head light for the electric lighting plant of small size motor vehicles, comprising a head lamp casing, a reflector, and an automatic cut-out arranged in the chamber formed by said reflector with the rear end of the head lamp casing.

3. A head light for the electric lighting plant of small size motor vehicles, comprising a head lamp casing, a reflector, an automatic cut-out, and a voltage regulator said elements arranged in the chamber formed by said reflector and the rear end of the head lamp casing.

4. A head light for the electric lighting plant of small size motor vehicles, comprising a head lamp casing, a reflector, an automatic cut-out arranged in the chamber formed by said reflector and the rear end of the head lamp casing, and a charge switch for switching the current generation in or off and arranged in the apex of said head lamp casing this switch serving also for switching the clamps in said head lamp casing.

5. A head light for the electric lighting plant of small size motor vehicles, comprising a head lamp casing, a reflector, an automatic cut-out arranged in the chamber formed by said reflector and the rear end of the head lamp casing, and a charge switch for switching the current generation in or off and arranged in the apex of said head lamp casing this switch serving also for switching the lamps in said head lamp casing, and an electrical indicating instrument arranged on the top side of said head lamp casing.

In testimony whereof we affix our signatures.

FRITZ SINGER.
FRANZ SCHNEIDER.